Patented Dec. 26, 1950

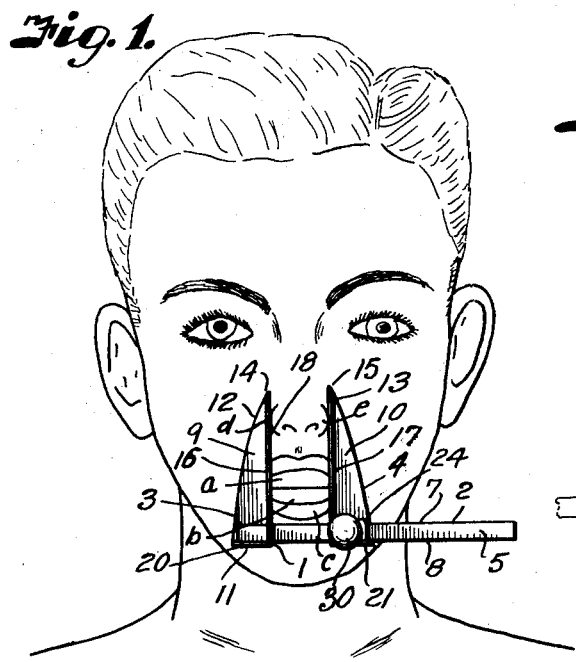
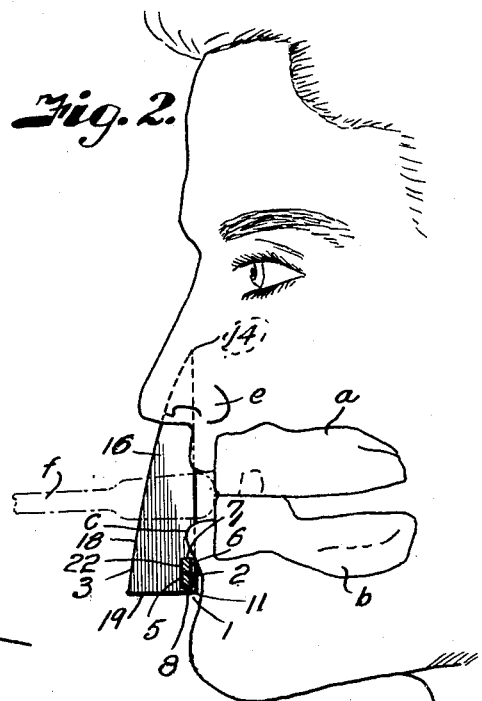
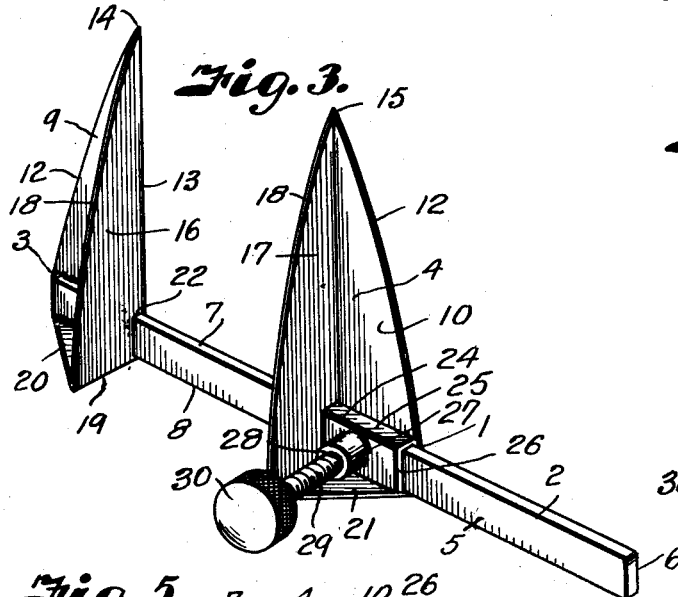
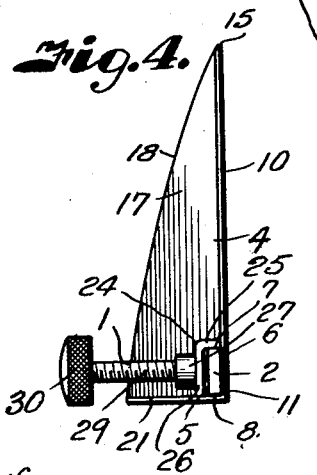
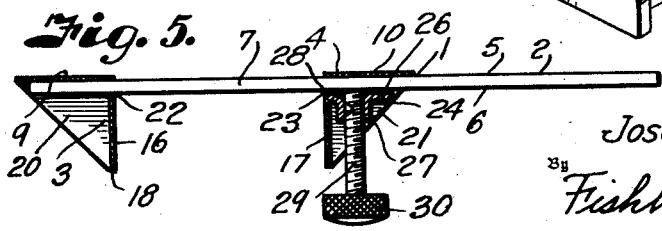
Inventor
Joseph Earl Scott.
By Fishburn + Mullendore
Attorneys

2,535,163

UNITED STATES PATENT OFFICE 2,535,163

INSTRUMENT FOR DETERMINING SIZE AND LOCATION OF ANTERIOR TEETH

Joseph Earl Scott, Pratt, Kans.

Application August 18, 1948, Serial No. 44,826

3 Claims. (Cl. 33—174)

This invention relates to an instrument for use in dental prosthesis and more particularly to an instrument for determining size and location of teeth to be used in artificial dental plates. For example, it often happens that a prosthodontist does not have the advantage of observing his patient prior to extraction of the natural teeth and consequently, it has been difficult to judge the size and location of the artificial teeth which are best suited to the patient's face. Therefore, it is the purpose of the present invention to provide an instrument which is adapted to be adjusted to the lips and nose of a patient for obtaining proper width of the six anterior teeth and which is used as a guide for marking the bite plates, thereby establishing the exact location at which the six anterior teeth are to be subsequently applied to the bite plates.

It is also an object of the invention to provide an instrument of this character that can be used with conventional tooth sizing charts.

Other objects of the invention are to provide a relatively small, light weight but strongly constructed instrument which retains its shape and adjustment during marking of the bite plates and after removal from the face of the patient for use on the tooth charts.

In accomplishing these and other objects of the invention as hereinafter described, I have provided an improved structure, the preferred form of which is illustrated in the accompanying drawing wherein:

Fig. 1 is a view of an instrument constructed in accordance with the present invention and showing application thereof to the face of a patient with the bite plates in position within the patient's mouth.

Fig. 2 is a side view of the patient's face showing the bite plates diagrammatically and the instrument in cross section, and with a spatula being used to mark the bite plates.

Fig. 3 is an enlarged perspective view of the instrument.

Fig. 4 is a side view of the instrument.

Fig. 5 is a section through the gauge elements of the instrument taken along the slide bar.

Referring more in detail to the drawings:

1 designates an instrument constructed in accordance with the present invention and which includes a bar 2, a gauge element 3 fixed to one end of the bar and gauge element 4 slidable on the bar to and from the gauge element 2.

The bar 1 is preferably of rectangular cross section and has flat front and rear faces 5—6 and upper and lower guide edges 7—8. The bar is of sufficient length to provide the desired maximum movement of the gauge element 4 and allow enough projection of the bar to facilitate support thereof in the fingers of the prosthodontist when making the measurements as later described.

The gauge elements 3 and 4 are of substantially the same form and are preferably constructed of sheet metal to provide flat blade-like portions 9 and 10 in a plane parallel with the slide bar to contact the face and lips of the patient on the respective sides of the nose. The base portions 11 thereof are of the desired width to give stable support on the bar and the outer edges 12 curve upwardly and inwardly from the base portions to join with straight inner edges 13 in points 14 and 15.

The gauge elements are of such length that with the slide bar positioned in the sulcus below the vermillion of the lower lip the points will extend along side the alae of the nose. In order to provide ample guiding surface along the straight edges 13 of the gauge elements, the metal is bent at right angles along the straight edges 13 to provide flat forwardly projecting wings or blade portions 16 and 17 with the outer edges 18 curving downwardly from the points 14 and 15 to provide relatively wide base edges 19 which are braced from the base edges 11 by substantially triangular webs 20 and 21 to hold the wings at exactly right angles to the blade portions 9 and 10 respectively. The wings of the gauge elements 3 and 4 have slots 22 and 23 immediately in front of the blade portions 9 and 10 and directly above the upper faces of the triangular webs 20 and 21, the slots 22 and 23 conforming in shape to the cross section of the slide bar 2.

To provide an adequate guide support for the movable gauge element 4, an angle member 24 having a short leg 25 and a long leg 26 respectively corresponding to the thickness and width of the bar 2 is soldered or otherwise secured within the angle between the web 21 and base of the blade portion 10 with the short leg secured to the blade portion and the longer leg to the web portion, the angle being of a length to be coextensive with the base 11.

Projecting from the angle is a boss 27 having an internally threaded opening 28 to mount the shank 29 of a thumb screw 30 to engage the bar and draw the blade portion 10 of the gauge element 4 into clamping contact with the rear face 5 of the bar as shown in Fig. 5.

The parts are assembled by sliding one end of the bar 2 through the slot 22 of the gauge element 3 until the end is in registry with the outer edge 12. The bar is then fixed to the gauge element as by soldering or the like, care being taken that the wing 16 thereof is at right angles to the bar. The movable gauge 4 is then slid onto the opposite end of the bar and the thumb screw 30 tightened.

The completed instrument if not constructed of stainless metal may have the surfaces suitably treated to prevent corrosion and give a finished appearance.

In using the instrument for obtaining the location of the six anterior teeth on the bite plates, the plates *a* and *b* are inserted in the patient's mouth as shown in Fig. 2. The thumb screw 30 is loosened and the movable gauge element 4 is moved along the bar 2 to permit entrance of the nose between the gauge elements when the instrument is placed on the patient's face as shown in Figs. 1 and 2. With the instrument in place, the bar 2 is kept horizontal below the vermillion of the lower lip c and with the fixed gauge element 3 touching the right ala d of the nose the movable element 4 is slid along the bar until it lightly touches the left ala e whereupon the thumb screw 30 is tightened to maintain the spacing of the gauge elements 3 and 4. A warmed spatula f is then inserted between the lips. With the spatula guided first by the wing 16, a mark is made on the bite plates in exact registry with the plane of the guide face of that wing. The spatula is then shifted to the wing of the opposite gauge element and a similar mark is made at the side of the bite plate. These marks represent the exact spacing of the six anterior teeth and when the bite plates are removed the teeth are readily located thereon using the spatula marks as the locating means.

The setting of the gauge elements is maintained because the spacing therebetween represents the spacing of the six anterior teeth. The points 14 and 15 of the gauge elements are then applied to the various artificial tooth charts to determine the size of teeth which are required to fill the six anterior tooth spaces marked on the bite plates.

From the foregoing it is obvious that I have provided a simple instrument for accurately determining the spacing of the six anterior teeth and by which the spacing is accurately marked upon the bite plates. It is also obvious that the instrument also provides a convenient means for determining the size of the teeth required for the patient's mouth by use of the instrument on the usual tooth charts.

What I claim and desire to secure by Letters Patent is:

1. An instrument for determining width of the anterior teeth on bite plates while contained in a patient's mouth including, a substantially flat transverse bar adapted to rest within the sulcus and below the vermillion of the lower lip of the patient, gauge elements carried by said transverse bar, each including a relatively thin blade-like portion extending upwardly from the bar and having a planar surface extending across the corners of the patient's mouth, said blade portions of the respective gauge elements having straight parallel facing side edges terminating in points in plane with said planar surfaces at the ala of the patient's nose and having opposite side edges diverging downwardly and outwardly from said points to provide relatively wide base portions, said gauge elements also including right angular blade portions in plane with said straight edges of the first-named blade portions and having edges diverging outwardly from said points to provide relatively wide base portions and flat guide surfaces in plane with said points adapted for guiding a heated spatula for marking the bite plates, and means mounting the gauge elements on the transverse bar with one movable toward the other.

2. An instrument for determining width of the anterior teeth on bite plates while contained in a patient's mouth including, a substantially flat transverse bar adapted to rest within the sulcus and below the vermillion of the lower lip of the patient, gauge elements carried by said transverse bar, each including a relatively thin blade-like portion extending upwardly from the bar and having a planar surface extending across the corners of the patient's mouth, said blade portions of the respective gauge elements having straight parallel facing side edges terminating in points in plane with said planar surfaces at the ala of the patient's nose and having opposite side edges diverging downwardly and outwardly from said points to provide relatively wide base portions, said gauge elements also including right angular blade portions in plane with said straight edges of the first-named blade portions and having edges diverging outwardly from said points to provide relatively wide base portions and flat guide surfaces in plane with said points adapted for guiding a heated spatula for marking the bite plates, webs connecting the base portions of the respective gauge elements below said bar to maintain said right angular relation of the blade portions, and means mounting the gauge elements on said transverse bar with one gauge element being movable to and from the other when adjusting said points thereof to the ala of the patient's nose.

3. An instrument for determining width of the anterior teeth on bite plates while contained in a patient's mouth including, a substantially flat transverse bar adapted to rest within the sulcus and below the vermillion of the lower lip of the patient, gauge elements carried by said transverse bar, each including a relatively thin blade-like portion extending upwardly from the bar and having a planar surface extending across the corners of the patient's mouth, said blade portions of the respective gauge elements having straight parallel facing side edges terminating in points in plane with said planar surfaces at the ala of the patient's nose and having opposite side edges diverging downwardly and outwardly from said points to provide relatively wide base portions, said gauge elements also including right angular blade portions in plane with said straight edges of the first-named blade portions and having edges diverging outwardly from said points to provide relatively wide base portions and flat guide surfaces in plane with said points adapted for guiding a heated spatula for marking the bite plates, webs connecting the base portions of the respective gauge elements below said bar, one of said gauge elements being rigidly fixed to the transverse bar, a sleeve fixed within the angle of the base portions of the other guide element for slidably mounting said gauge element on the transverse bar to move relatively to the fixed gauge element when adjusting the points relatively to the ala of the nose, and a clamping screw carried by the sleeve and having a shank portion adapted to frictionally engage the transverse bar to anchor said slidable gauge element in an adjusted position on the bar.

JOSEPH EARL SCOTT.

REFERENCES CITED

The following references are of record in the file of this patent:

UNITED STATES PATENTS

| Number | Name | Date |
| --- | --- | --- |
| 85,430 | Burrows | Dec. 29, 1868 |
| 139,601 | Nagle | June 3, 1873 |
| 226,429 | Varnum | Apr. 13, 1880 |
| 783,804 | Smith | Feb. 28, 1905 |
| 883,660 | Marr | Mar. 31, 1908 |
| 1,262,678 | Lapoint | Apr. 16, 1918 |
| 1,516,631 | D'Erville | Nov. 25, 1924 |
| 1,598,248 | Paine | Aug. 31, 1926 |